(12) United States Patent
Despins et al.

(10) Patent No.: US 7,381,289 B2
(45) Date of Patent: Jun. 3, 2008

(54) METHOD AND APPARATUS FOR SEAMING ABUTTING LAYERS OF PLANAR MATERIAL

(76) Inventors: Maurice Despins, 11203 - 105 Street, Edmonton, Alberta (CA) T5G 2M4; David Despins, 11203 - 105 Street, Edmonton, Alberta (CA) T5G 2M4

( * ) Notice: Subject to any disclaimer, the term of this patent is extended or adjusted under 35 U.S.C. 154(b) by 259 days.

(21) Appl. No.: 11/282,765

(22) Filed: Nov. 17, 2005

(65) Prior Publication Data
US 2006/0065362 A1    Mar. 30, 2006

(51) Int. Cl.
*B29C 65/54* (2006.01)
(52) U.S. Cl. ................... 156/304.3; 156/304.4; 156/307.7; 156/546; 156/547
(58) Field of Classification Search ............. 156/304.4, 156/304.7, 502, 505, 304.3, 544, 546, 547
See application file for complete search history.

(56) References Cited

U.S. PATENT DOCUMENTS

| | | |
|---|---|---|
| 2,701,003 A | 2/1955 | Kamborian |
| 3,099,582 A | 7/1963 | Ongstad |
| 3,145,413 A | 8/1964 | Gunther |
| 3,349,971 A | 10/1967 | Gury |
| 3,963,357 A | 6/1976 | Crisp |
| 3,972,768 A * | 8/1976 | Hill .............................. 156/545 |
| 4,260,273 A | 4/1981 | Hemperly et al. |
| 4,484,976 A | 11/1984 | Despins |
| 4,536,244 A * | 8/1985 | Greci et al. ............... 156/304.4 |
| 4,581,091 A * | 4/1986 | Lane ........................ 156/304.4 |
| 4,613,396 A | 9/1986 | Scarborough |
| 5,250,145 A | 10/1993 | Despins et al. |
| 5,824,175 A * | 10/1998 | Hoopengardner ........... 156/229 |
| 6,196,746 B1 | 3/2001 | Onischuk |
| 6,761,199 B1 * | 7/2004 | Metzger ...................... 156/391 |

\* cited by examiner

*Primary Examiner*—Mark A Osele
(74) *Attorney, Agent, or Firm*—Sheridan Ross P.C.

(57) ABSTRACT

A method and apparatus is provided for seaming together abutting side-by-side layers of planar material with adhesive and a backing tape to form a finished seam extending along the line of abutment. The method consists of laying a backing tape underneath the line of abutment between adjacent layers of planar material, such as floor covering, followed by dispensing an adhesive through an applicator tip along the edges of the abutting layers while simultaneously centering the backing tape with the line of abutment with the applicator tip and dispensing adhesive though the applicator tip on top of the backing tape. The edges of the abutting layers are then pressed together and against the backing tape until the adhesive has at least partially set thereby forming a finished seam.

8 Claims, 10 Drawing Sheets

METHOD AND APPARATUS FOR SEAMING ABUTTING LAYERS OF PLANAR MATERIAL

FIELD OF THE INVENTION

The present invention is concerned with a method and apparatus for seaming abutting side-by-side layers of planar material with adhesive and a backing tape to form a finished seam extending along the line of abutment.

Definitions:

For purposes of this specification, "planar material" is intended to include floorcoverings such as carpet and resilient flooring material. "Carpet" refers to a heavy fabric floorcovering made of natural or synthetic textiles that has a woven backing comprised of jute or similarly sturdy fibers. "Resilient flooring" is generally known to include linoleum, rigid-backed vinyl (such as CORLON®), cushion-backed vinyl and homogeneous vinyl. "Sub-floor" refers to the floor surface underneath the floorcovering being installed. "Pad" refers to the layer of underlay that is sometimes installed on the sub-floor prior to the installation of carpet so to provide an additional layer of cushioning. "Open seam" is intended to describe the gap formed between the vertical side edges of abutting layers of planar material, which gap appears when the marginal planar material portions adjacent the side edges are simultaneously raised by the apparatus passing thereunder. "Closed seam" is intended to describe the linear break between the abutting layers of planar material when they are lying flat on the floor with the side edges not yet bonded by adhesive to each other or to a backing tape. And "finished seam" is intended to describe the seam after applied adhesive has bonded the abutting layers of planar material to each other and to the backing tape.

BACKGROUND OF THE INVENTION

On large floor surfaces, floorcovering is installed in multiple pieces in order to fully cover the surface. During installation, the edges of the abutting layers of floorcovering are bonded or "seamed" together to form a contiguous layer of floorcovering over the floor surface. This requires that there are minimal or no gaps along the closed seam. Often, the closed seam is formed by overlapping one layer of floorcovering over another and then cutting both layers at once. This produces a closed seam that has virtually no gaps along its length. Typically, resilient flooring is seamed by laying the vertical edges of adjacent and abutting layers in close contact, folding back the adjacent marginal portions of the floorcovering to expose the sub-floor, applying a band of flooring adhesive along the line of abutment using a spreader and then bringing the marginal portions back together onto the sub-floor and rolling the seam with a hand roller to ensure adhesion between the floorcovering and the sub-floor. With certain types of resilient flooring, it is necessary that some adhesive squeeze up along the line of abutment thereby gluing the edges of abutting layers to each other in addition to the sub-floor. This technique is used in the installation of carpet as well.

In the early-nineties, one of the present applicants developed a novel applicator tip for dispensing adhesive to seam adjacent layers of floorcovering. This is disclosed in U.S. Pat. No. 5,520,145 issued Oct. 5, 1993. This applicator tip is hereinafter referred to as the "prior tip".

The prior tip is used to apply adhesive to the edges of abutting pieces of floorcovering and to the sub-floor underneath the floorcovering along the line of abutment when the floorcovering is glued directly to the sub-floor. The prior tip comprises a fixed opening for connection with an adhesive dispenser such as a squeeze bottle and outlet orifices to dispense adhesive on the edges of the floorcovering and to the sub-floor itself. The prior tip is placed in the open seam and manually advanced by pulling it along the line of abutment from one end of the seam to the other end while the bottle is squeezed. In doing so, adhesive is dispensed on the edges and to the sub-floor along the line of abutment.

This method is usually performed in stages or portions along the line of abutment. Adhesive is first applied to a span of approximately 12" to 18" and then the edges of the floorcovering are manually brought into close contact with one another and then hand-rolled to form the finished seam. This process is repeated along the line of abutment until the finished seam is completed. One problem with the prior tip is that the adhesive dispenser attached to the prior tip is oriented upwards at an angle leading in the direction that the prior tip follows to form the finished seam. As the dispenser and prior tip are advanced along the line of abutment towards a wall, the dispenser prevents the tip from being advanced right up tight to the wall. To finish the seam, the prior tip must then be turned around 180 degrees and be advanced backwards from the wall towards the point where it was stopped previously.

In the art of installing floorcovering, it is also known to use a backing tape to reinforce a finished seam. This involves applying the backing tape to the back of the floorcovering along the line of abutment. The backing tape reinforces the finished seam to provide additional resistance against the adjacent layers being pulled apart. The current method of installing a backing tape involves gluing the backing tape to the sub-floor or pad underneath the line of abutment with a floor adhesive. The marginal edge portions of the floorcovering are then glued to the backing tape.

The backing tape itself is comprised of lines or strips of thermoplastic adhesive on its top surface running along its length. To activate the thermoplastic adhesive so that the floorcovering will bond to the backing tape, a heating iron is placed in the open seam between the floorcovering and the backing tape. The iron heats the thermoplastic adhesive until it becomes molten. The iron is then manually drawn along the backing tape to heat a portion of the backing tape adhesive. While the thermoplastic adhesive is still molten, the edges of the abutting floorcovering layers are fitted to one another and then hand-rolled such that the marginal edge portions are brought into contact with the molten adhesive and are bonded to the backing tape as the adhesive cools and sets.

There are a number of disadvantages with this method. First, no adhesive is placed between the abutting edges of the floorcovering. The only bonding that occurs is between the bottom surface of the marginal portions of the floorcovering and the backing tape. Second, there is a risk that the heat produced by the iron to melt the thermoplastic adhesive will melt or burn the floorcovering itself. Third, this method is difficult to used when making finished seams that are curved. The bulkiness of the backing tape with thermoplastic adhesive makes the tape difficult to bend and form curves. Fourth, gluing the backing tape to the sub-floor or pad makes it difficult to move the backing tape once the floor adhesive begins to set to compensate for any adjustments in placement of the floorcovering when the finished seam is formed. Lastly, this method of installation is awkward and requires considerable skill to produce a finished seam.

It is therefore desirable to seam abutting layers of floor-covering with a backing tape without the shortcomings of the prior art method.

SUMMARY OF THE INVENTION

The present invention is concerned with a method and apparatus for seaming abutting side-by-side layers of planar material with adhesive and a backing tape to form a finished seam extending along the line of abutment. Specifically, the present invention is concerned with the seaming together of adjacent pieces of floorcoverings such as carpet and resilient flooring.

The method of the present invention is concerned with producing a finished seam between abutting layers of floor covering by bonding the edges of the abutting layers to one another while simultaneously bonding the bottom surface of the marginal portions of the abutting layers to a backing tape that is centered along the line of abutment.

In this method, the backing tape used is simply a band of material compatible with the floorcovering being installed. The backing tape does not include any strips or lines of adhesive, thereby making it flexible and more suitable for forming finished seams that are curved. For carpets, the backing tape may be a fabric or textile material similar to the carpet's backing, whereas for vinyl flooring, the tape may be a plastic or vinyl material.

The method of the present invention comprises the following steps:
1. The abutting layers are trimmed to form a line of abutment with minimal or no gaps along the closed seam.
2. While keeping the adjacent layers of floor covering in place, the marginal portion of the adjacent layers are lifted up along the line of abutment to permit a length of backing tape to be laid down along the open seam. The marginal portions of adjacent layers are then folded back against the sub-floor or pad.
3. Using the apparatus of the present invention, placed in the open seam between the layers, an adhesive suitable for joining the floorcovering is dispensed from the apparatus along the edges of the abutting layers while simultaneously centering the backing tape along the line of abutment and further dispensing adhesive onto the top surface of the backing tape.
4. The edges of the abutting layers are then manually pressed against each other and against the backing tape and then hand-rolled until the adhesive has at least partially set and bonded the edges to one another and to the backing tape.

It should be obvious to those skilled in the art that the backing tape used in this method is selected from a group of materials that is complementary to the floor covering being installed. Likewise, the adhesive selected is complementary to the floor covering and the backing tape so as to produce a strong finished seam when the adhesive has set.

The apparatus of the present invention is a novel applicator tip that dispenses adhesive along the edges of abutting layers of floorcovering and onto the top surface of a backing tape while simultaneously centering the backing tape underneath the floorcovering along the line of abutment.

The applicator tip comprises an upright body having, from top to bottom, a leg portion, a relatively narrow ankle portion, a foot portion and a tape retainer portion. The body has a leading edge and a trailing edge which are aligned with the line of abutment.

The leg portion has an internal passageway, that has a longitudinal axis that is substantially vertical, and connection means at its upper end for connection with an adhesive dispenser, so that adhesive may flow from the dispenser into the leg passageway. The dispenser may take the form of a squeeze bottle that dispenses adhesive in liquid form when the bottle is squeezed. The dispenser may also be a butane or electric-powered device that melts solid adhesives, such as thermoplastic adhesives, and has means for injecting molten adhesive through the connection means into the leg passageway of the applicator tip.

Preferably, the connection means is an elbow-shaped device that can swivel about a vertical axis substantially parallel to the leg passageway. One end of the elbow attaches to the upper end of the leg portion while the other end attaches to the adhesive dispenser. The ability of the elbow to swivel allows the dispenser to rotate out of the way from obstacles, such as a wall, permitting the applicator tip to be used to complete a finished seam in one continuous pass.

The foot portion has a flat bottom surface whose longitudinal center is aligned with the line of abutment. The foot portion has downwardly sloping sides that up-lift and tilt the marginal portions of the abutting layers of floor covering and guide the edges towards the ankle portion as the tip is moved along the open seam. The foot portion also has a pair of spaced-apart runners or keels that protrude downwards from the bottom surface. The runners extend along at least partially from the leading edge to the trailing edge and are parallel with the line of abutment. The runners serve to raise the bottom surface off of the sub-floor or pad. The runners are spaced sufficiently apart to permit the applicator tip to straddle the backing tape and center it while the finished seam is being completed.

The ankle portion has an ankle passageway transverse to the line of abutment, extending from side to side through the ankle portion. This passageway is in communication with the leg passageway. The ankle passageway forms an outlet or orifice on each side of the ankle portion to allow adhesive injected into the leg passageway to be dispensed from the orifices onto the edges of the upraised and tilted floor covering.

The foot portion has a foot passageway in communication with the leg passageway. The foot passageway forms orifices, preferably on the trailing edge of the body and located above the bottom surface. These orifices permit adhesive being injected into the leg passageway to be dispensed from the orifices onto the backing tape as the applicator tip is advanced along the open seam.

In a preferred embodiment, the applicator tip comprises a core element, referred to as an "insert", that is sandwiched between two body halves that are fastened together. The insert comprises the connections means of the leg portion, the leg passageway, the ankle passageway, the ankle orifices, the foot passageway and the foot orifices. The bottom surface of the insert also forms part of the bottom surface of the foot portion.

The tape retainer portion has retaining means for lifting the backing tape up from the sub-floor or pad to be in close proximity to the bottom surface of the foot portion while simultaneously centering the tape along the open seam. In doing so, adhesive is dispensed from the trailing edge of the body onto the top surface of the tape at the same time adhesive is being dispensed onto the edges of the upraised and tilted floorcovering.

In a preferred embodiment, the retaining means is a detachable member, referred to as a "clip", that snaps onto both runners after the tape is placed between the clip and the body, thereby sandwiching the tape between the clip and the body. In an alternate embodiment, the retaining means may comprise two lateral wings that extend inwardly from the runners, the wings each extending partially toward the center of the body. The tape is positioned between the wings and the bottom surface by sliding the tape through the gap between the wings.

It is an object of the present invention to seam abutting layers of floor covering with adhesive and a backing tape by dispensing adhesive to the edges of the abutting layers while simultaneously centering the backing tape along the line of abutment and dispensing adhesive between the abutting layers and onto the top surface of the backing tape.

It is a further object of the present invention to provide an applicator tip that produces a finished seam between abutting layers of floor covering by dispensing adhesive to the edges of the abutting layers while simultaneously centering a backing tape and centering a backing tape along the line of abutment and dispensing adhesive onto the top surface of the backing tape.

Broadly stated, the method of the present invention comprises the steps of fitting the edges of the abutting layers of planar material to one another to form a line of abutment, placing a length of backing tape underneath the planar material along the line of abutment, dispensing adhesive along the abutting edge of at least one layer of planar material while simultaneously centering the tape along the line of abutment and dispensing adhesive onto the surface of the tape abutting the planar material, and pressing the edges of the abutting layers of planar material against each other and against the tape until the adhesive has at least partially set so as to form a finished seam along the line of abutment.

Broadly stated, the apparatus of the present invention is an applicator tip for seaming abutting side-by-side layers of planar material with adhesive and a backing tape to form a finished seam extending along the line of abutment, comprising an upright body having, from top to bottom, a leg portion, a relatively narrow ankle portion, a foot portion, and a tape retainer portion, the body having a leading edge and a trailing edge which are aligned with the line of abutment, the leg portion forming a leg passageway extending longitudinally therethrough, the leg portion having connection means at its upper end for connection with an adhesive supplied dispenser whereby adhesive may flow from the dispenser into the leg passageway, the foot portion having a bottom surface having a longitudinal center line aligned with the seam, the foot portion comprising tilting means for uplifting and tilting marginal portions of the planar material layers and for bringing the edges of the planar material close to the ankle portion side surfaces as the tip is advanced along the line of abutment, the foot portion having a pair of spaced-apart runners protruding downwards from the bottom surface, the runners extending at least partially from the leading edge to the trailing edge, the runners substantially parallel with the line of abutment, the ankle portion having an ankle passageway transverse to the line of abutment, the ankle passageway extending through the ankle from side to side and communicating with the leg passageway, the ankle passageway forming a first outlet means for dispensing adhesive immediately above the central part of the tilting means, whereby adhesive is directed towards the edge of the adjacent upraised and tilted planar material, the foot portion having a foot passageway in communication with the leg passageway, the foot passageway forming a second outlet means for dispensing adhesive immediately above the bottom surface from the trailing edge of the body, and the tape retainer portion having tape alignment means for guiding the tape towards the bottom surface and for centering the tape along the line of abutment, whereby the top surface of the tape receives adhesive as it is dispensed from the second outlet means.

DETAILED DESCRIPTION OF THE PREFERRED EMBODIMENT

Figure 1:
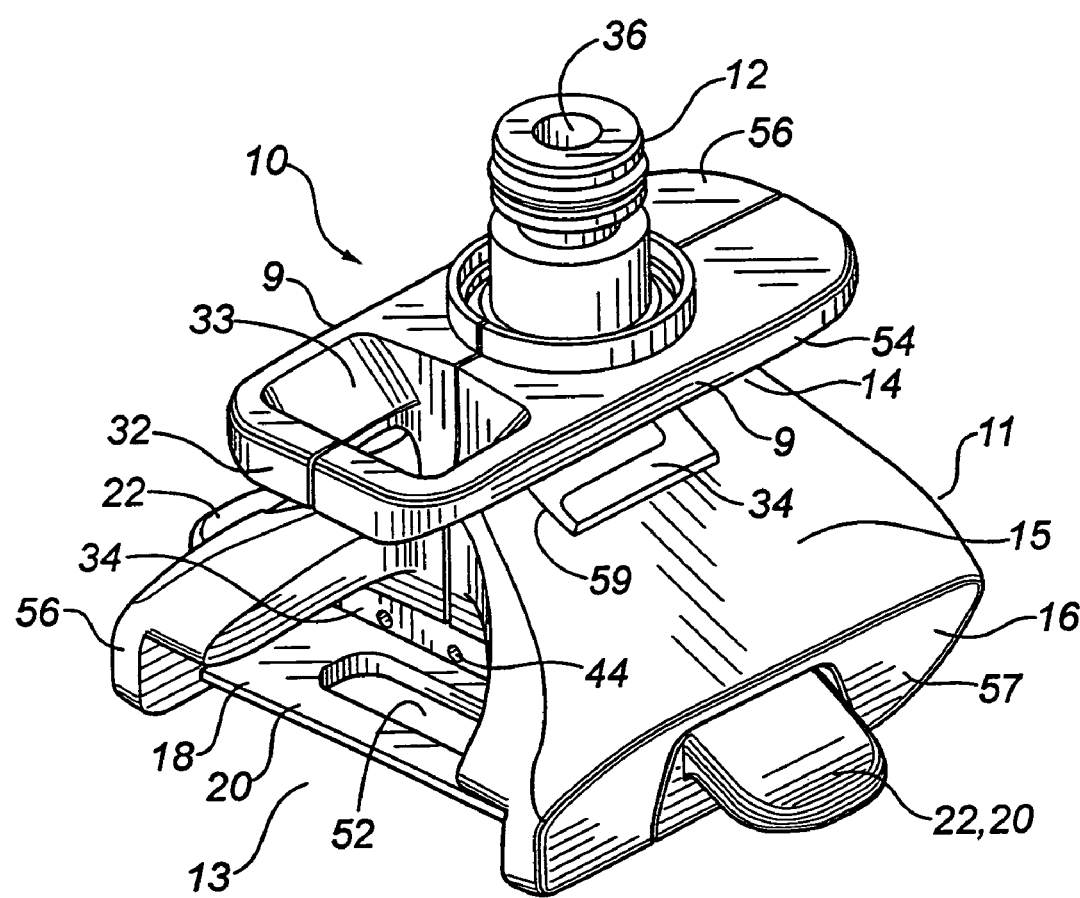
FIG. 1 is a perspective view of the apparatus of the present invention.

The apparatus of the present invention is concerned with an application tip for seaming adjacent, side-by-side abutting layers of floor covering and is shown in FIGS. 1, 3, 4, 5 and 6. The apparatus is applicator 10 which comprises, from top to bottom, leg portion 12, ankle portion 14, foot portion 16 and tape retainer portion 18. Applicator 10 has a front leading edge 11 and a rear or trailing edge 13 when in use.

Figure 7:
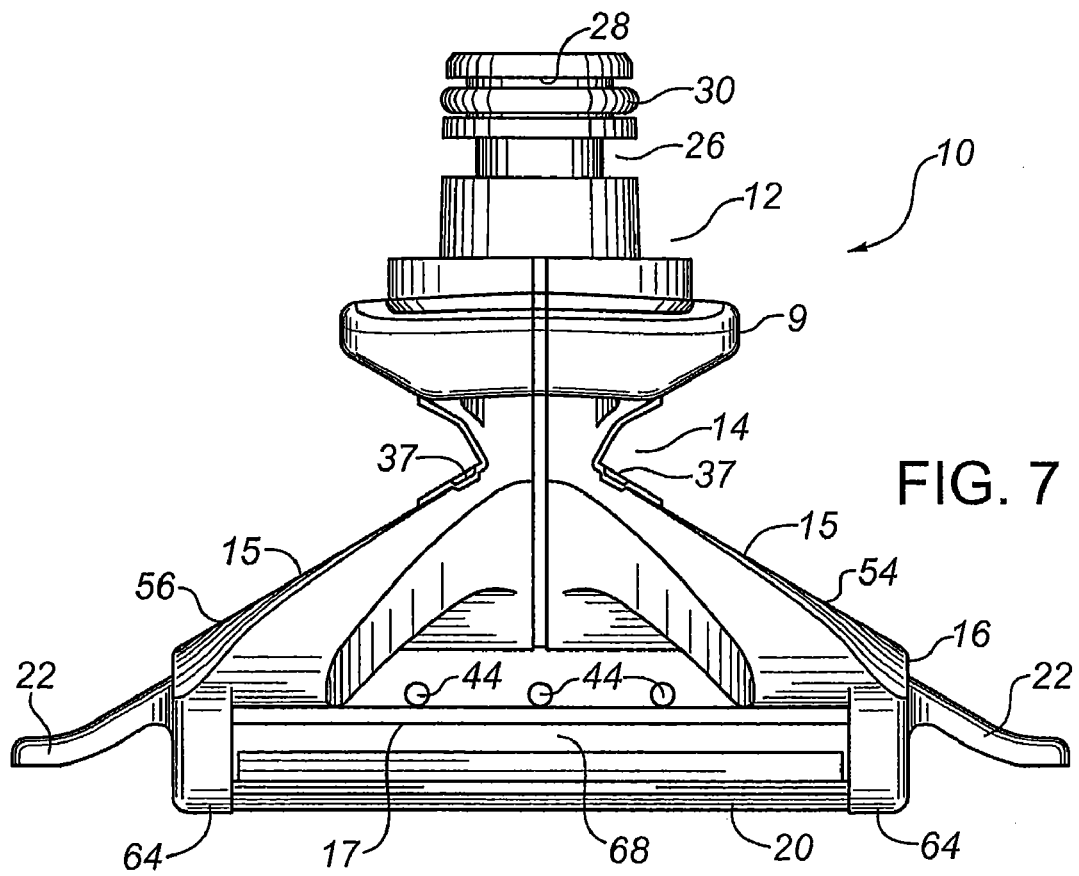
FIG. 7 is rear plan view of the apparatus of the present invention.
Figure 6:
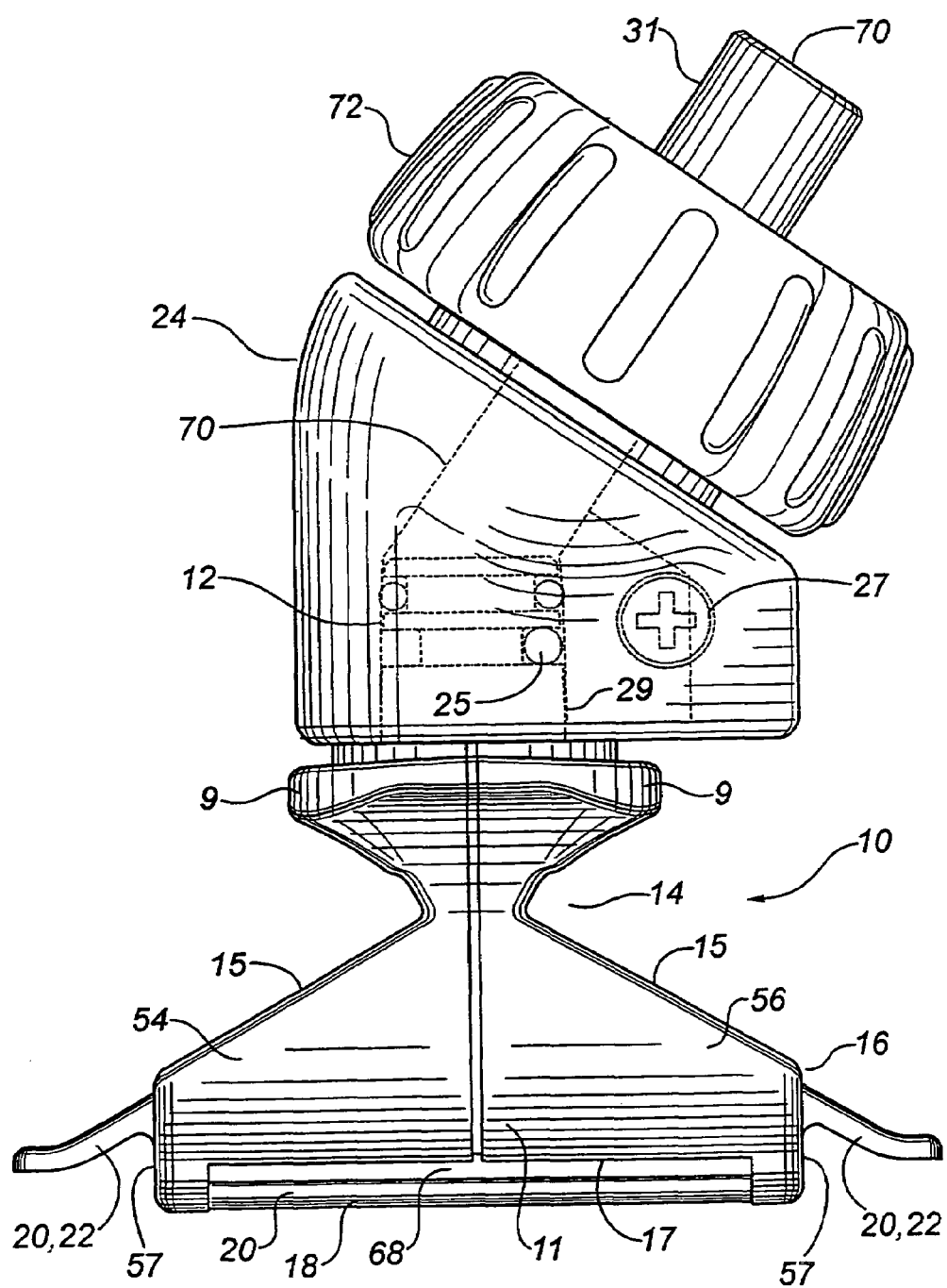
FIG. 6 is front plan view of the apparatus of the present invention.
Figure 8:
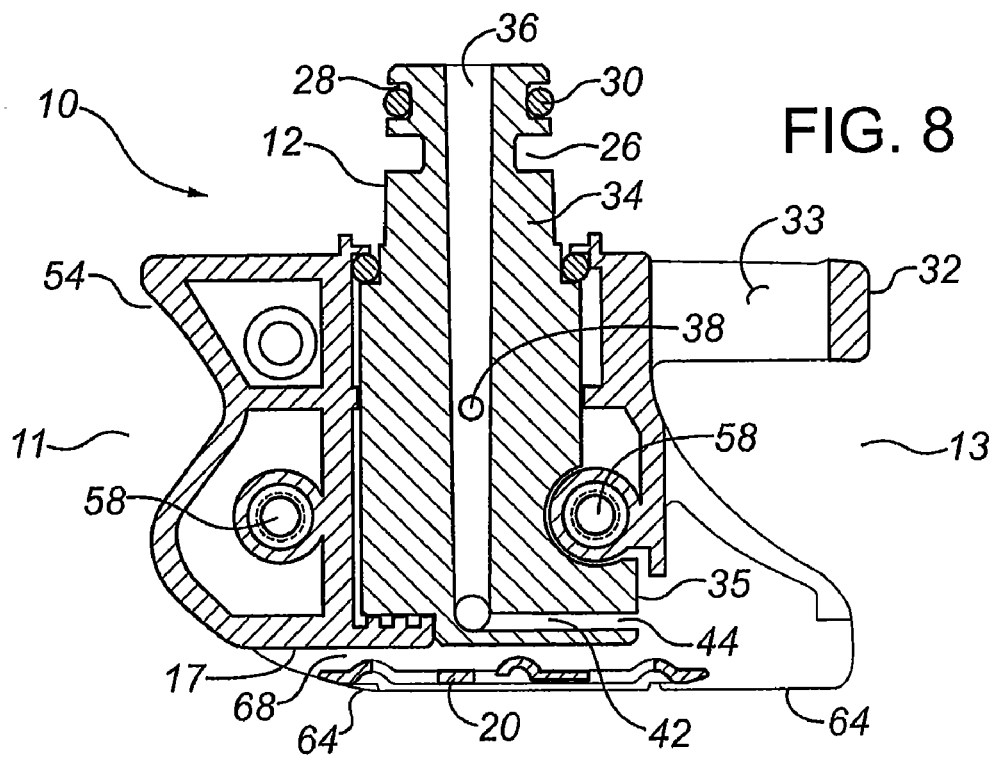
FIG. 8 is a cross-sectional side view of the apparatus of the present invention along section line VIII-VIII.
Figure 9:
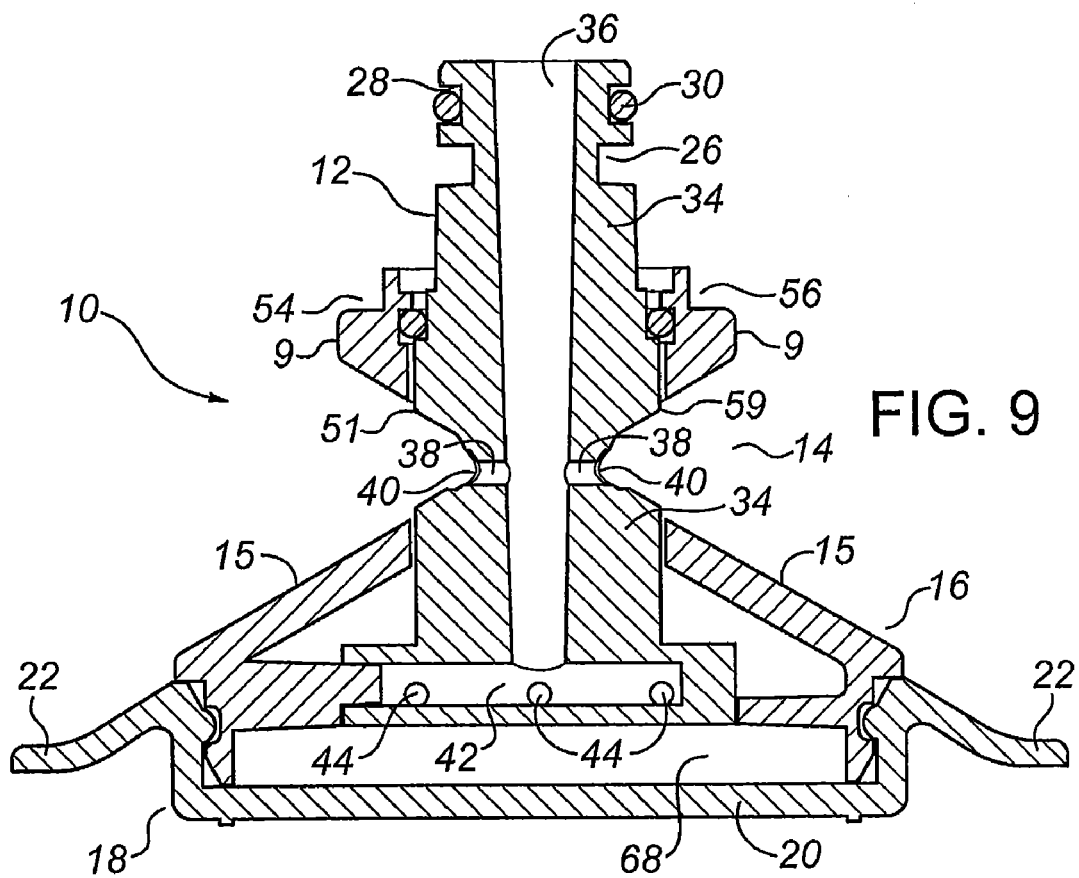
FIG. 9 is a cross-sectional side front view of the apparatus of the present invention along section line IX-IX.
Figure 11:
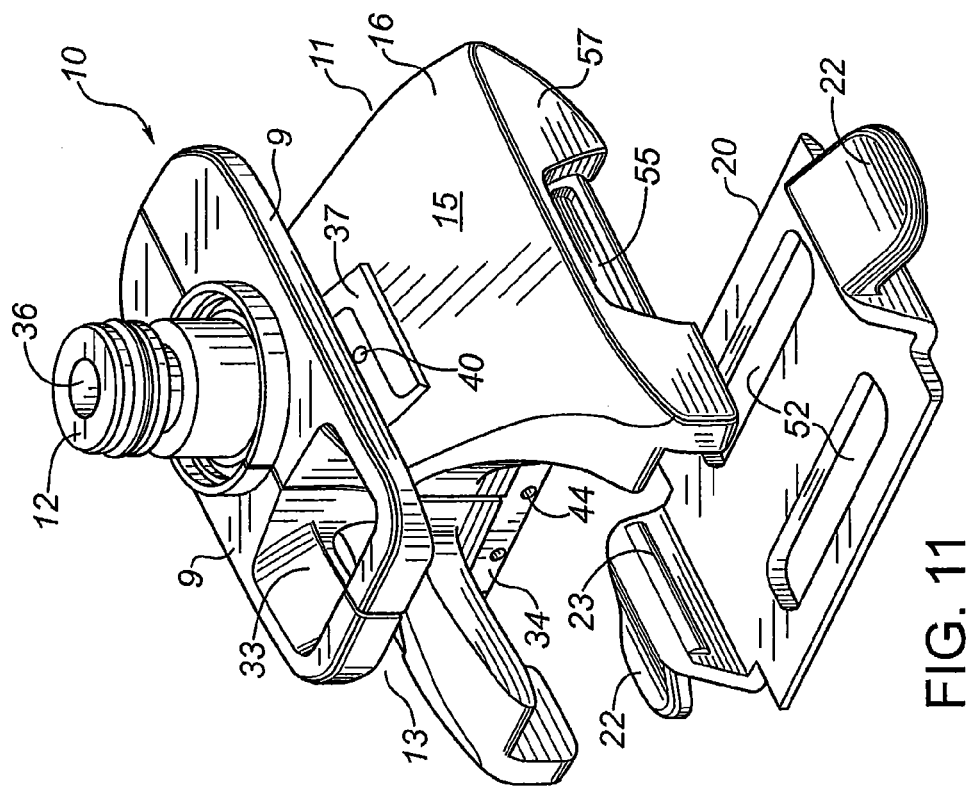
FIG. 11 is an exploded top perspective view of the apparatus of the present invention.
Figure 10:
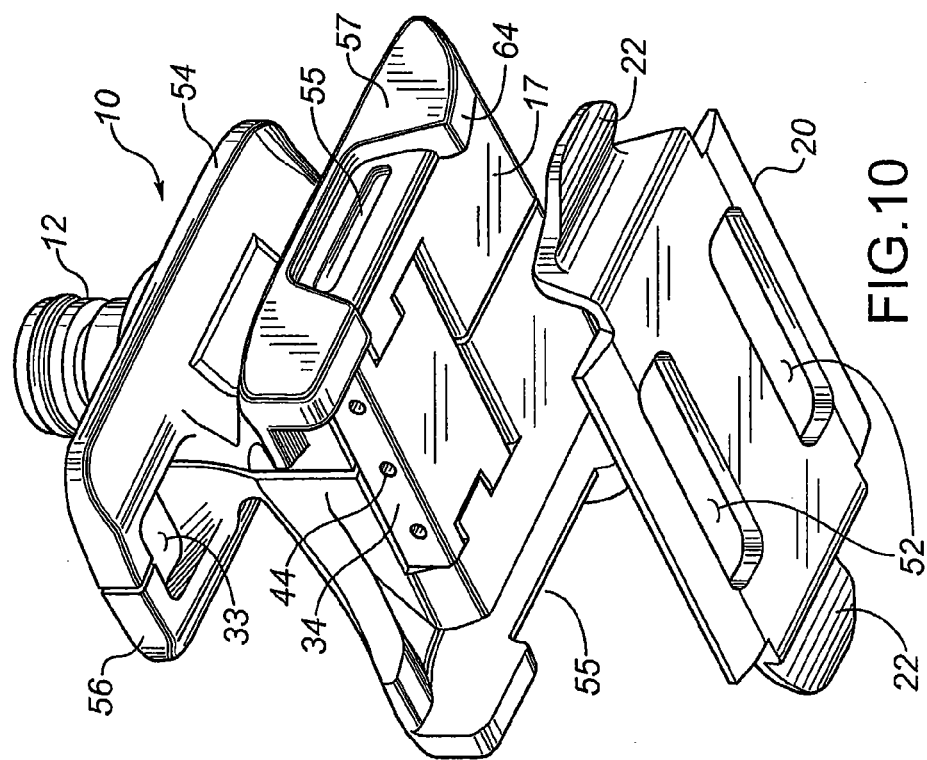
FIG. 10 is an exploded bottom perspective view of the apparatus of the present invention.
Figure 12:
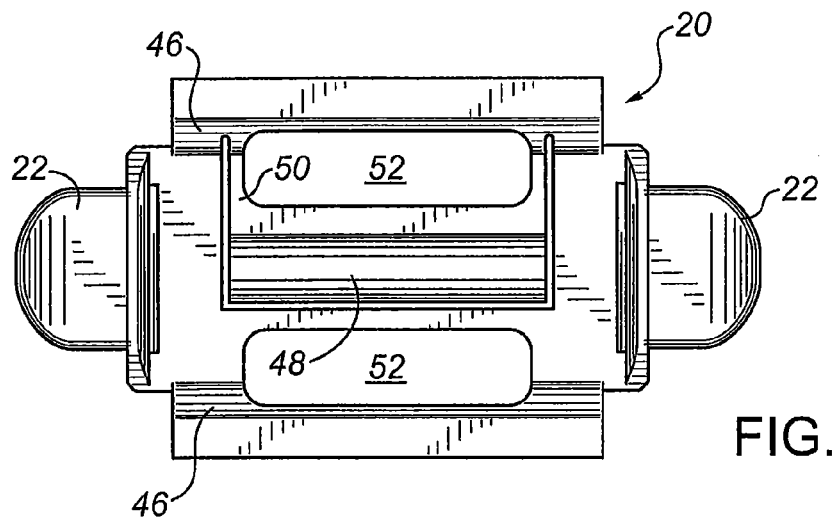
FIG. 12 is a top plan view of the clip of the apparatus of the present invention.
Figure 13:
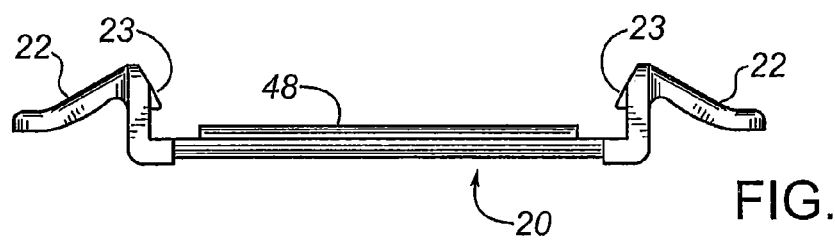
FIG. 13 is front elevation view of the clip of the apparatus of the present invention.
Figure 14:
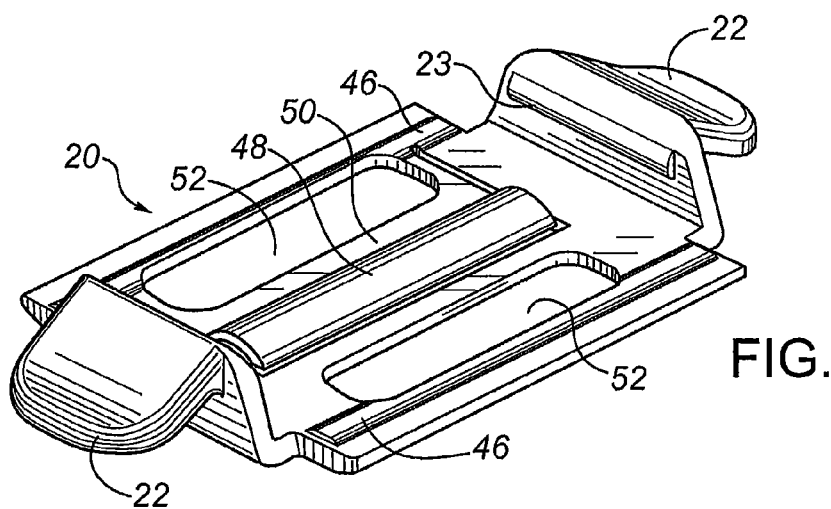
FIG. 14 is a top perspective view of the clip of the apparatus of the present invention.

In the preferred embodiment, as shown in FIGS. 7 and 8, applicator 10 is an assembly of insert 34, right body half 54 and left body half 56. Insert 34 is sandwiched between right body half 54 and left body half 56. Screws 60 pass through holes 58 to fasten right body half 54 and left body half 56 together. When insert 34 is assembled with body halves 54 and 56 to form applicator 10, side surfaces 37 of insert 34 protrude through opening 51 on right body half 54 and through opening 59 on left body half 56. Insert 34 is preferably made of aluminum but may be made of other metals that have good heat conduction properties. Body halves 54 and 56 are preferably made of a non-metal material, such as plastic or composite material, that is capable of withstanding the heat associated with melting solid thermoplastic adhesives.

Figure 15:
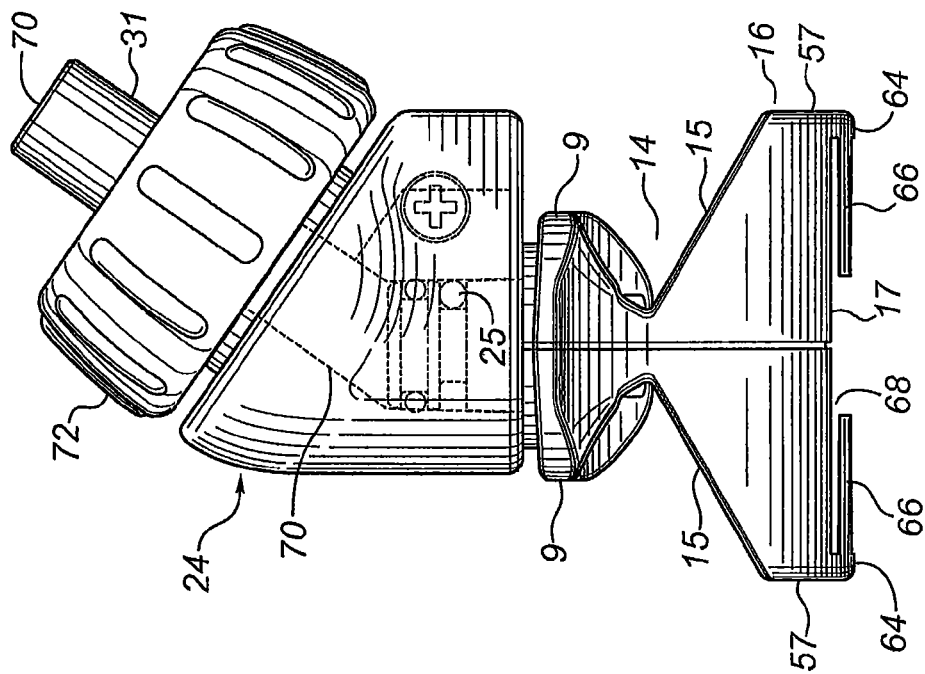
FIG. 15 is side elevation view of an alternate embodiment of the apparatus of the present invention with the elbow attached.
Figure 16:
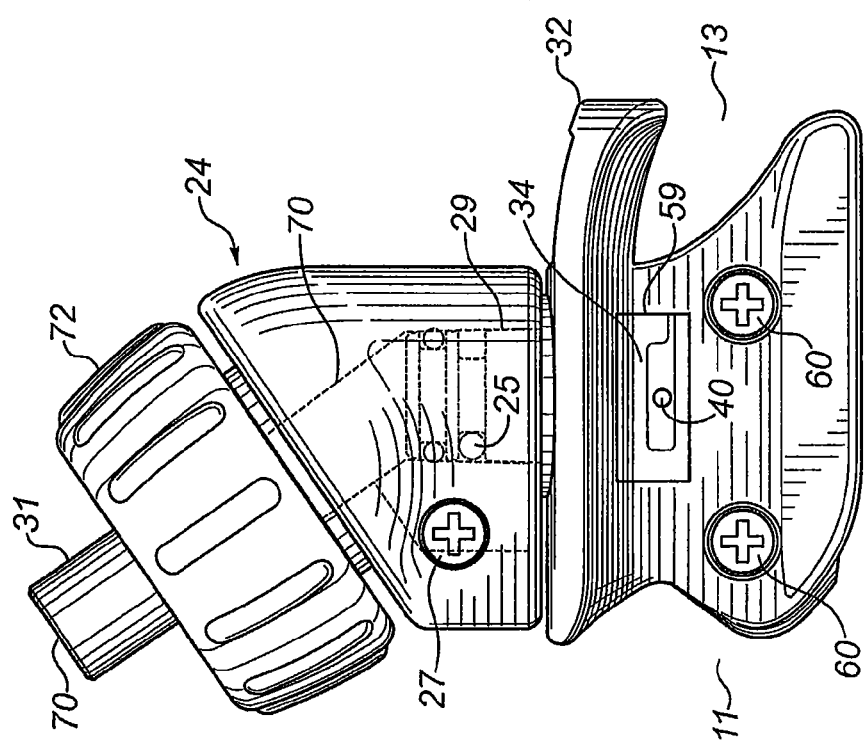
FIG. 16 is a front elevation view of an alternate embodiment of the apparatus of the present invention.

As shown in FIGS. 15 and 16, applicator 10 is adapted for connection with an adhesive dispenser (not shown) that is connected to leg portion 12 via elbow 24. In the preferred embodiment, as shown in FIG. 8, leg portion 12 is an upper vertical extension of insert 34. From bottom to top, leg portion 12 comprises retainer groove 26 and o-ring groove 28. O-ring 30 is placed in o-ring groove 28.

Elbow 24 comprises of passageway 70 extending therethrough from receptacle 29 up to upper connector 31. Upper connector 31 has a longitudinal axis that is transverse to the longitudinal axis of receptacle 29 such that elbow 24 has a "bent" or "elbow-shaped" configuration.

Receptacle 29 is adapted for a tight slip-fit connection with the upper end of leg portion 12. O-ring 30 provides a substantially fluid-tight seal between receptacle 29 and leg portion 12. Elbow 24 comprises retainer pin 25 that is adapted to sit in retainer groove 26. Tightening elbow screw 27, in combination with retainer pin 25 sitting in retainer groove 26, secures elbow 24 to applicator 10 while still allowing elbow 24 to swivel 360° about the longitudinal axis of leg portion 12. The adhesive dispenser attached to upper connector 31 comprises a complementary coupling means (not shown) that operates to connect with coupling 72 to secure the dispenser to elbow 24.

The adhesive dispenser may be a squeeze bottle if the adhesive is in liquid form. If the adhesive is a solid thermoplastic glue suitable for joining floorcovering, the adhesive dispenser may be a hot glue gun adapted to connect with upper connector 31 and coupling 72. It should be obvious to those skilled in the art that the form of adhesive dispenser used with applicator 10 is dependent on the type of adhesive being applied. So long as the dispenser has complementary coupling means to connect with upper connector 31 and coupling 72, and can inject adhesive in fluid form into applicator 10, any suitable type of dispenser may be used.

As shown in FIG. 8, applicator 10 comprises a leg passageway 36 that extends from leg portion 12 longitudinally therethrough. In the preferred embodiment, leg passageway 36 is contained within insert 34.

Ankle portion 14 is generally rectangular in cross section when viewed from above. It is narrow from its leading edge to its trailing edge relative to leg portion 12 and foot portion 16. Ankle portion 14 forms an ankle passageway 38 which extends therethrough from side to side and is in communication with leg passageway 12. Ankle passageway 38 terminates in ankle orifices 40 on side surfaces 37, located at the juncture of ankle position 14 and foot portion 16.

Foot portion 16 comprises a pair of downwardly and laterally slanting wedges 15. Wedges 15 have top surfaces 19 and a common bottom surface 17. In the preferred embodiment, the bottom of insert 34 forms part of, and is flush with, bottom surface 17.

Foot portion 16 forms an internal foot passageway 42 extending longitudinally therethrough. Foot passageway 42 is in communication with leg passageway 36 and forms foot orifices 44 on rear face 35. In the preferred embodiment, foot passageway 42 and foot orifices 44 are contained within insert 34. Central foot orifice 44 is positioned on rear face 35 to coincide with seam 4. The remaining foot orifices 44 are laterally spaced on each side of the longitudinal centerline of bottom surface 17.

Foot portion 16 comprises a pair of laterally spaced runners 64 on each side of the longitudinal centerline of bottom surface 17. Runners 64 protrude downwards from bottom surface 17 and extend at least partially from leading edge 11 to trailing edge 13. Runners 64 are spaced sufficiently laterally apart to accommodate the width of backing tape 5.

Tape retainer portion 18 comprises clip 20, as shown in FIGS. 10 to 14, that releasably attaches to the bottom of applicator 10. Clip 20 snaps onto applicator 10 by aligning latches 23 with recesses 55 and then pressing applicator 10 down onto clip 20. Clip 20 is made of a suitably malleable material, so that when applicator 10 is pressed onto clip 20, latches 23 are pushed outwards slightly by applicator 10 until latches 23 snap into recesses 55, thereby attaching clip 20 to applicator 10 and forming channel 68. To remove clip 20 from applicator 10, downward pressure on tabs 22 pulls latches 23 away from recesses 55, allowing applicator 10 to be lifted up from clip 20.

Clip 20 is symmetrical in design, allowing applicator 10 to be attached to clip 20 in a forward facing or rearward facing orientation. Clip 20 also comprises openings 52. When applicator 10 is not in use and is sitting upright on the floor, openings 52 allow any residual adhesive that seeps from foot orifices 44 to drip onto the surface below the clip and not onto the top surface of the clip itself.

Clip 20 comprises tape guides 74 which are spaced laterally apart and are parallel with the longitudinal centerline of bottom surface 17. Tape guides 74 are centered about the centerline of bottom surface 17 and are spaced sufficiently far apart to accommodate the width of backing tape 5. When backing tape 5 is sandwiched between bottom surface 17 of applicator 10 and clip 20, tape guides 74 center backing tape 5 with the line of abutment.

Clip 20 also comprises outer protrusions 46 and inner protrusion 48. Protrusions 46 and 48 are substantially perpendicular to the centerline of bottom surface 17. Inner protrusion 48 is further mounted at the end of cantilever spring 50 and is centered between leading edge 11 and trailing edge 13. Protrusions 46 are spaced laterally apart and are substantially centered about inner protrusion 48. Protrusions 46 and 48 face upwards from clip 20 and serve to lift and direct backing tape 5 within channel 68 towards bottom surface 17. This is done to ensure that adhesive dispensed from foot orifices 44 is applied to the top surface of backing tape 5. Inner protrusion 48 preferably extends upwards higher than outer protrusions 46. Spring 50 causes inner protrusion 48 to press backing tape 5 against bottom surface 17. In doing so, backing tape 5 is placed under tension as applicator 10 is drawn along open seam 7 during the seaming process. Keeping backing tape 5 under tension helps minimize any bumps or wrinkles from forming as backing tape 5 is bonded to floorcovering 2, as finished seam 6 is being formed.

Figure 17:
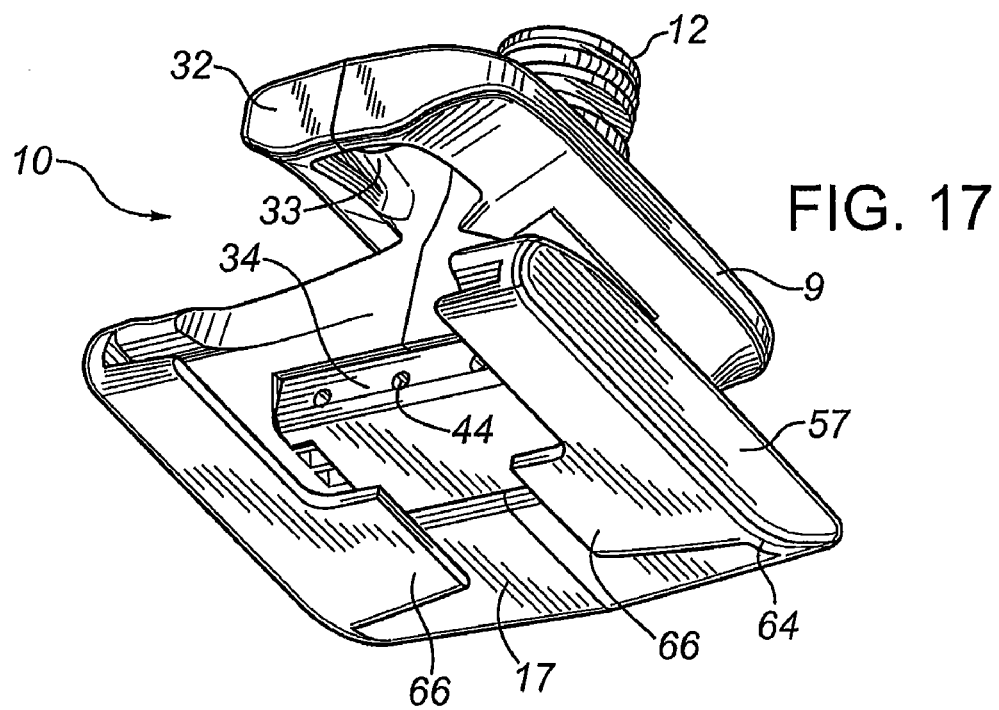
FIG. 17 is a bottom perspective view of an alternate embodiment of the apparatus of the present invention.

In an alternate embodiment, as shown in FIGS. 15, 16 and 17, tape retainer portion 18 comprises a wing 66 extending inwardly from each runner 64 partway towards the longitudinal centerline of bottom surface 17, thereby forming channel 68.

With either embodiment of tape retainer portion 18, channel 68 is formed. Channel 68 centers backing tape 5 with open seam 7. Central foot orifice 44 delivers a bead of adhesive that is centered onto the top surface of backing tape 5 and is aligned with closed seam 4 while the other foot orifices 44 deliver beads of adhesive onto the top surface of backing tape 5 that are parallel to but laterally spaced from the center bead.

Extending laterally outward from the sides of body 8, above ankle portion 14, are wing members 9. Each wing member 9 is positioned above its adjacent ankle side surface 37 and extends longitudinally in a generally horizontal plane both forwardly and rearwardly of ankle orifices 40. Thus each adjacent associated pair of a wing member 9 and wedge 15 creates means for bracketing and guiding the upraised marginal portion 3 of floor covering 2 into the desired close-fitting engagement with ankle side surfaces 37.

At their rear ends, wing members 9 are connected by cross-member 32, which serves to support the wing members 9. Wing members 9 and cross-member 32 combine to form window 33, to provide visual access to the "work area" or the open seam 7 immediately downstream of ankle orifices 40.

Figure 2:
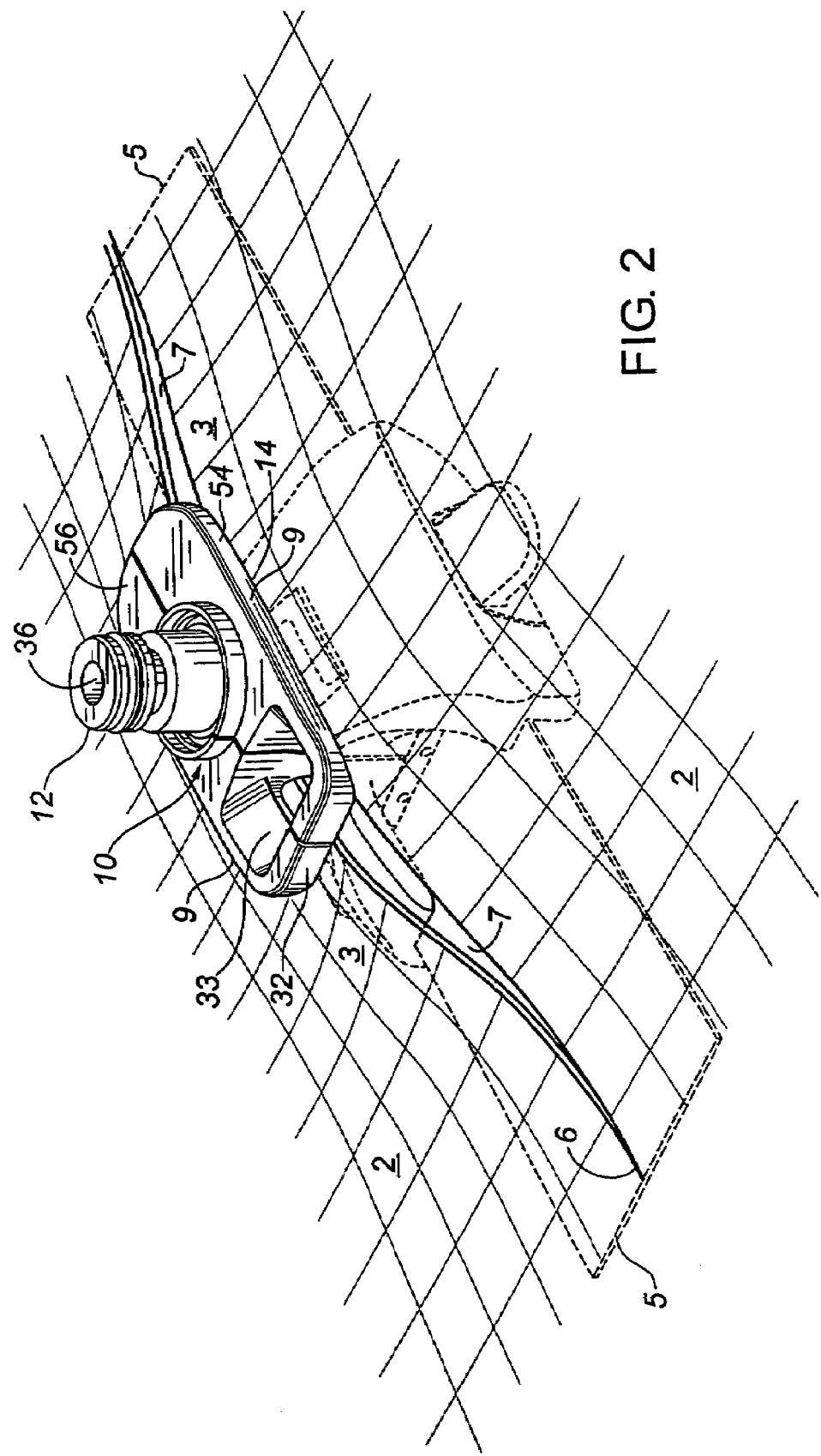
FIG. 2 is a perspective view of the apparatus of the present invention in place for seaming between layers of floorcovering.
Figure 3:
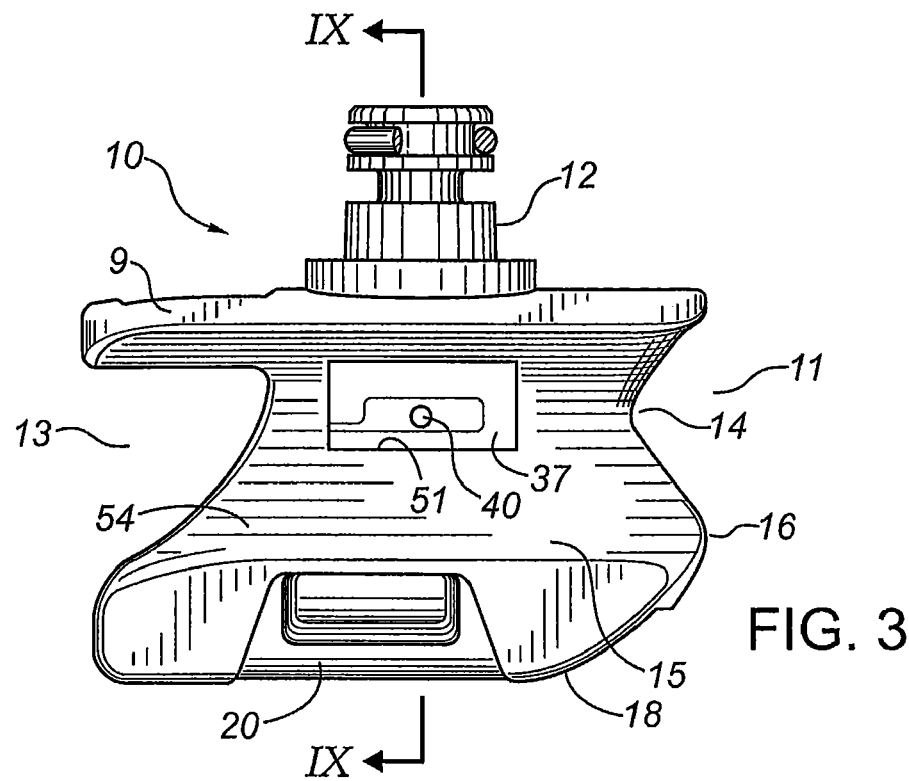
FIG. 3 is a side elevation view of the apparatus of the present invention.
Figure 4:
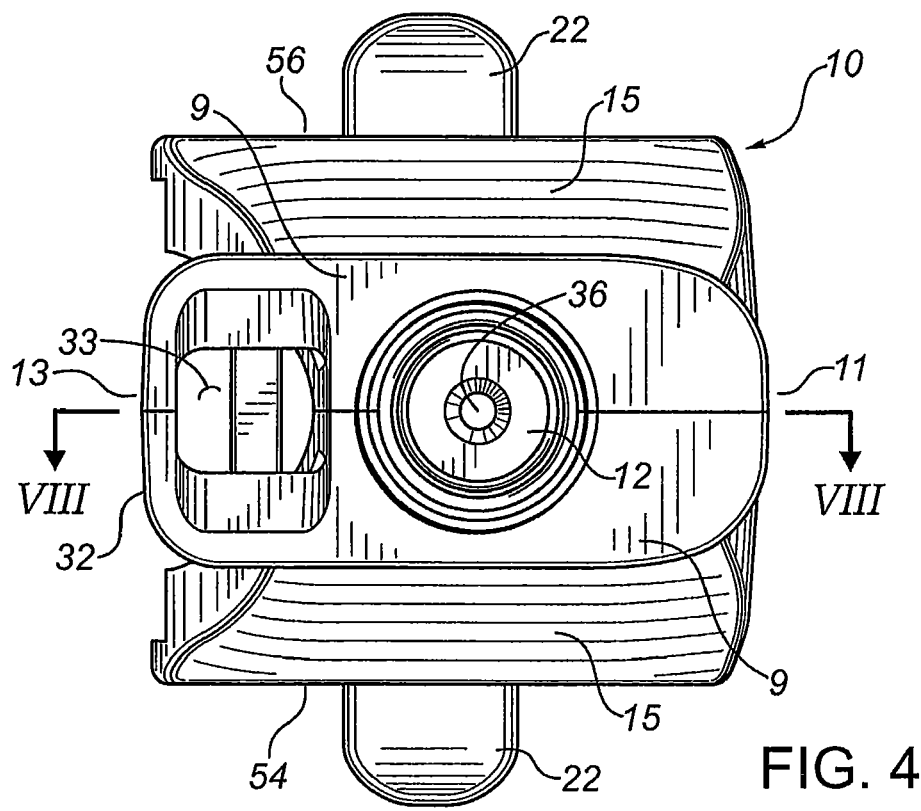
FIG. 4 is a top plan view of the apparatus of the present invention.
Figure 5:
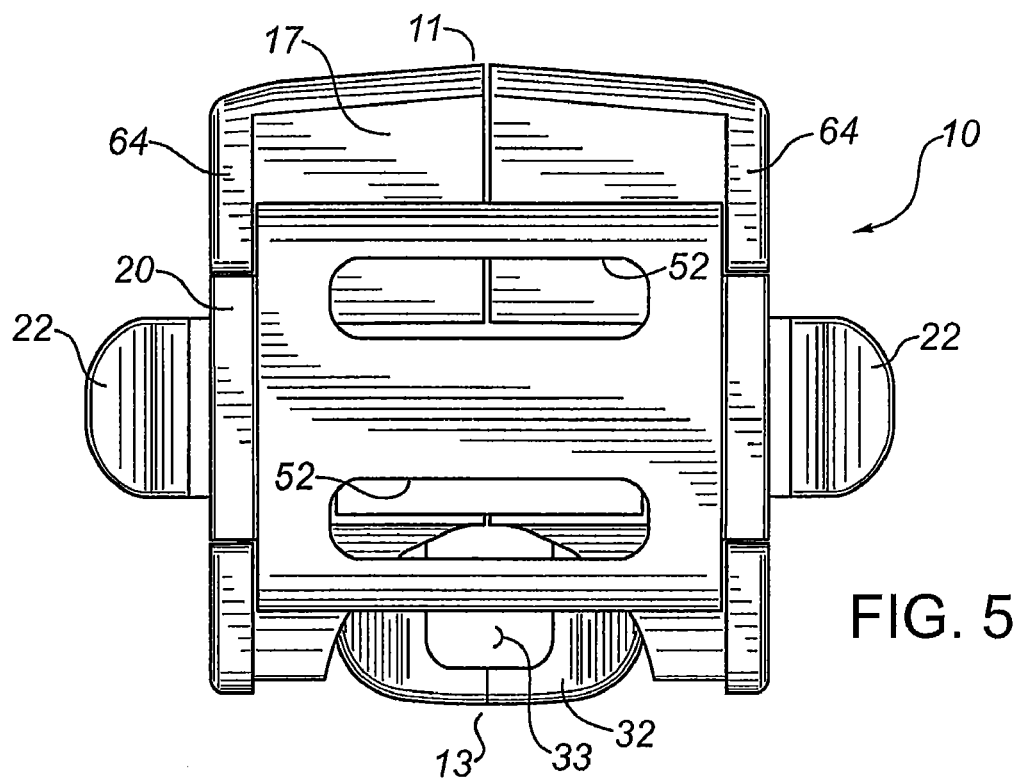
FIG. 5 is a bottom plan view of the apparatus of the present invention.
Figure 18:
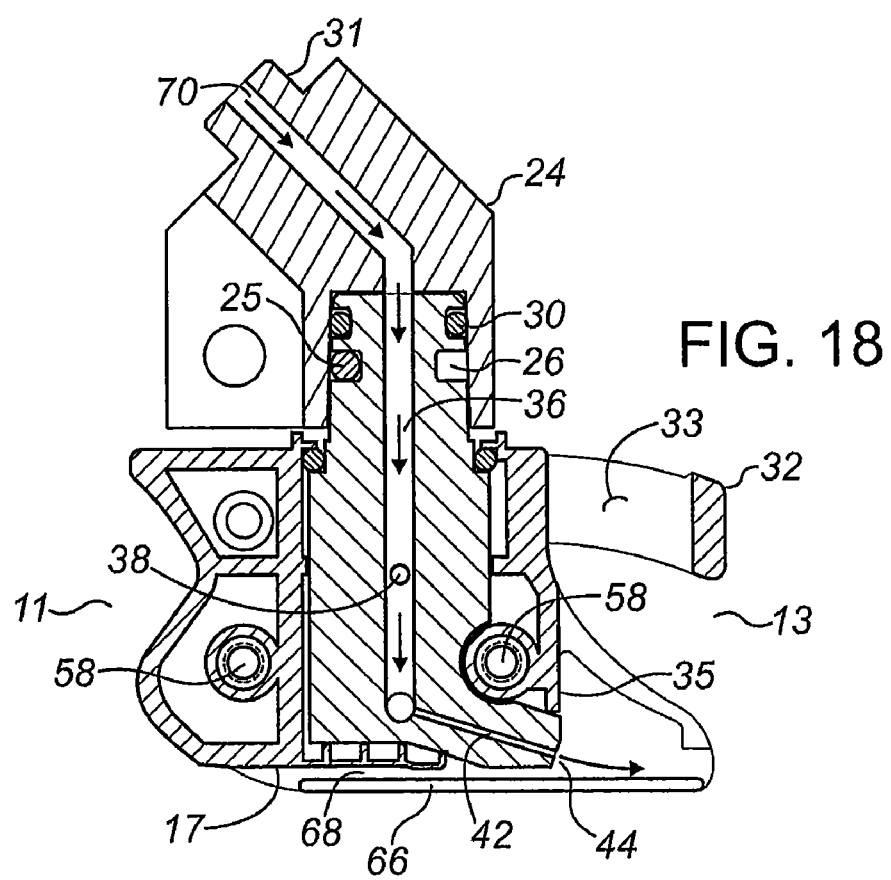
FIG. 18 is a cross-sectional side view of an alternate embodiment of the apparatus of the present invention with the elbow attached.

In the operation of the present invention, as shown in FIG. 2, marginal portions 3 of floorcovering 2 are raised to place a length of backing tape 5 along the line of abutment between the layers of floorcovering 2. At one end of the line of abutment, clip 20 is placed underneath backing tape 5, lifting it up off of the sub-floor or pad and centering it between tape guides 74. Clip 20 is symmetrical in its design, thereby making the orientation of clip 20, with respect to backing tape 5, unimportant. Applicator 10 is then snapped onto clip 20 thereby sandwiching backing tape 5 between bottom surface 17 of applicator 10 and clip 20. Marginal portions 3 of floorcovering 2 are then lowered such that wedges 15 of applicator 10 are inserted beneath marginal portions 3 of the layers of floorcovering 2. Wedges 15 function to raise and tilt marginal portions 3 so that open seam 7 results. Wing members 9 contact the top surfaces of upraised marginal portions 3 and bend floorcovering 2 downwardly a slight amount to bring the side edges 1 into snug engagement with ankle side surfaces 37 of insert 34 and with ankle orifices 40 formed therein. As shown in FIG. 18, adhesive injected into leg passageway 36 flows into ankle passageway 38 and exits through ankle orifices 40 onto side edges 1 of floorcovering 2 as applicator 10 is manually advanced along open seam 7. Adhesive injected into leg passageway 36 also flows into foot passageway 42 and exits through foot orifices 44 to deliver beads of adhesive onto the top surface of backing tape 5. Three beads of adhesive are applied: one bead aligned with open seam 7, and two beads in spaced parallel alignment on each side thereof. As applicator 10 is manually advanced along open seam 7 by an installer, runners 64 are kept in contact with the sub-floor or pad to maintain a consistent elevation of marginal portions 3 of floorcovering 2 and of backing tape 5. If floorcovering 2 is carpet, wing members 9 serve to bend the pile of the carpet away and to the side in the region of open seam 7, thereby rendering the area of adhesive application visible through window 33. As the installer manually advances applicator 10 along open seam 7, adhesive is simultaneously dispensed along side edges 1 and backing tape 5 for a portion or a span of closed seam 4. After dispensing adhesive on a portion of side edges 1 and backing tape 5, the installer then manually presses side edges 1 together while simultaneously pressing them against backing tape 5 as the adhesive begins to set, thereby forming finished seam 6. The installer may also apply a hand-roller along the just completed portion of finished seam 6 to ensure that marginal edges 3 are bonded to each other and to backing tape 5.

While it is intended that the present invention be used in the seaming of floorcovering, such as carpet and vinyl flooring, it is contemplated that the present invention may also be used in the seaming of planar material other than floorcovering. The terms and expressions in the preceding specification have been used therein as terms of description and not of limitation, and there is no intention in the use of such terms and expressions of excluding equivalents of the features shown and described or portions thereof, it being recognized that the scope of the invention is defined and limited only by the claims that follow.

The embodiments of the invention in which an exclusive property of privilege is claimed are defined as follows:

1. A method of seaming abutting side-by-side layers of planar material, the method comprising the steps of:
 a) fitting abutting edges of the abutting layers of planar material to one another to form a line of abutment;
 b) placing a length of non-adhesive backing tape underneath the planar material along the line of abutment;
 c) providing an applicator having an ankle portion, a tape retainer portion and a rear trailing edge, the applicator tip configured to dispense liquid adhesive or thermoplastic glue through at least one orifice disposed on the ankle portion and through at least one orifice disposed on the rear trailing edge;
 d) dispensing liquid adhesive or thermoplastic glue through the ankle portion of the applicator along the abutting edge of at least one layer of planar material while simultaneously centering the tape along the line of abutment with the tape retainer portion of the applicator and dispensing adhesive onto the surface of the tape abutting the planar material through the rear trailing edge of the applicator; and
 e) pressing the abutting edges of the abutting layers of planar material against each other and against the tape until the adhesive has at least partially set so as to form a finished seam along the line of abutment.

2. The method as set forth in claim 1 wherein adhesive is dispensed on the abutting edges of both layers of planar material.

3. The method as set forth in claim 1 wherein the seam is formed linearly along the line of abutment by advancing the applicator from one end of the line of abutment towards its opposite end as the applicator centers the tape and dispenses adhesive.

4. The method as set forth in claim 3 wherein the seam is formed by successively seaming portions of the abutting layers of planar material one portion at a time.

5. A method of seaming abutting side-by-side layers of floor covering, the method comprising the steps of:
 a) fitting the abutting edges of the abutting layers of floor covering to one another to form a line of abutment;
 b) placing a length of non-adhesive backing tape underneath the floor covering along the line of abutment;
 c) providing an applicator having an ankle portion, a tape retainer portion and a rear trailing edge, the applicator tip configured to dispense liquid adhesive or thermoplastic glue through at least one orifice disposed on the ankle portion and through at least one orifice disposed on the rear trailing edge;
 d) dispensing liquid adhesive or thermoplastic glue through the ankle portion of the applicator along the abutting edges of the floor covering while simultaneously centering the tape along the line of abutment with the tape retainer portion of the applicator and dispensing adhesive on the surface of the tape abutting the floor covering through the rear trailing edge of the applicator; and
 e) pressing the abutting edges of the abutting layers of floor covering against each other and against the tape until the adhesive has at least partially set so as to form a finished seam along the line of abutment.

6. The method as set forth in claim 5 wherein the seam is formed linearly along the line of abutment by advancing the applicator from one end of the line of abutment towards its opposite end as the applicator centers the tape and dispenses adhesive.

7. The method as set forth in claim 6 wherein the seam is formed by successively seaming portions of the abutting layers of floor covering one portion at a time.

8. The method as set forth in claim 5 wherein adhesive is dispensed on the abutting edges of both layers of floor covering.

* * * * *